(12) United States Patent
Tiana et al.

(10) Patent No.: US 9,527,602 B1
(45) Date of Patent: Dec. 27, 2016

(54) SYSTEM FOR AND METHOD OF PROVIDING AN ENHANCED VISION IMAGE USING SYNCHRONIZATION

(71) Applicants: Carlo L. Tiana, Portland, OR (US); Marvin R. Lovato, Linn, OR (US)

(72) Inventors: Carlo L. Tiana, Portland, OR (US); Marvin R. Lovato, Linn, OR (US)

(73) Assignee: Rockwell Collins, Inc., Cedar Rapids, IA (US)

(*) Notice: Subject to any disclaimer, the term of this patent is extended or adjusted under 35 U.S.C. 154(b) by 868 days.

(21) Appl. No.: 13/892,035

(22) Filed: May 10, 2013

(51) Int. Cl.
*H04N 7/18* (2006.01)
*B64D 47/08* (2006.01)

(52) U.S. Cl.
CPC ..................... *B64D 47/08* (2013.01)

(58) Field of Classification Search
CPC ........ H04N 7/005; G01C 11/025; G01C 11/02
USPC ........................................................ 348/144
See application file for complete search history.

(56) References Cited

U.S. PATENT DOCUMENTS

| | | | | |
|---|---|---|---|---|
| 4,920,412 A | * | 4/1990 | Gerdt | G01S 17/107 348/31 |
| 6,028,624 A | * | 2/2000 | Watkins | B64D 47/04 348/117 |
| 6,119,055 A | * | 9/2000 | Richman | G08G 5/0013 244/114 R |
| 2011/0074956 A1 | * | 3/2011 | Faber | G02B 23/12 348/148 |

\* cited by examiner

*Primary Examiner* — Michael Lee
(74) *Attorney, Agent, or Firm* — Donna P. Suchy; Daniel M. Barbieri

(57) ABSTRACT

A system and method can provide an enhanced or other sensed image on a display. The system and method can sense an environment using an enhanced vision sensor or other sensor and provide an enhanced vision image or other image in response to data from the enhanced vision sensor. The enhanced vision or other vision system adjusts the sensing operation when an aircraft light is on to reduce back scatter effects.

20 Claims, 5 Drawing Sheets

SYSTEM FOR AND METHOD OF PROVIDING AN ENHANCED VISION IMAGE USING SYNCHRONIZATION

BACKGROUND OF THE INVENTION

The present disclosure relates generally to display systems. More particularly, the present disclosure relates to sensor-based vision systems.

Displays are utilized in a wide variety of applications including but not limited to medical, military, avionic, transportation, entertainment and computing applications. The displays can provide sensed images of an environment. In certain applications, enhanced vision images and/or remotely sensed images are generally provided to the display to augment an operator's view of an environment or target. The enhanced vision image or remotely sensed image are generally provided by sensors (e.g., cameras) directed toward the environment or target.

In one exemplary application, displays are used in head down display (HDD) systems, head up display (HUD) systems and wearable displays, such as, helmet mounted display (HMD) systems. In vehicle (e.g., aircraft) applications, HUD and HMD systems advantageously allow operators (e.g., the flight crew) to maintain eye contact with the outside environment while simultaneously viewing display information from vehicle systems and sensors in a graphical and alphanumeric format overlaying the outside world view. The display information can include an enhanced vision image or remotely sensed image from a camera or other imaging sensor (such as a visible light imaging sensor, night vision equipment, infrared imaging sensor, millimeter wave radar imager, a remote camera, etc.).

In aircraft applications, enhanced vision systems (EVS) can be used for landing and can be designed to extract information about air field visible landing aids in low visibility conditions, such as, heavily scattering fog, and other conditions. Aircraft lights (e.g., anti-collision lights) can provide light that can back scatter when illuminating the fog and can therefore blind or adversely affect the operation of the EVS.

Aircraft lights can include one or more anti-collision lights. The anti-collision lights illuminate the vital areas around the airplane. The field of coverage generally extends in each direction within at least 75 degrees above and 75 degrees below the horizontal plane of the airplane. The arrangement of the anti-collision lights generally gives an effective flash frequency of not less than 40, and not more than 100 cycles per minute in certain applications. The effective flash frequency is the frequency at which the aircraft's complete anti-collision light system is observed from a distance, and applies to each sector of light including any overlaps that exist when the system consists of more than one light. Each anticollision light's effective intensity generally must equal or exceed 400 candles at an angle of 0 to 5 degrees above or below the horizontal plane of the aircraft. Wing tip mounted anticollision lights can provide significant back scatter due to their high power.

Lights associated with other types of vehicles can also cause back scatter which interferes with images captured by sensors (e.g., cameras). Ships, boats and other vehicles can have similar lighting systems that can affect display systems Accordingly, there is a need for a system for and method of providing an optimal enhanced vision or remotely sensed image. There is also a need for systems for and methods of reducing light back scatter effects associated with a sensed image. There is a further need for systems for and methods of displaying enhanced vision images during approach and/or landing without back scatter or blinding affects. There is still a further need for systems for and methods of providing sensed vision image coordinated or synchronized with sources of light.

SUMMARY OF THE INVENTION

A system and method can provide an enhanced or other sensed image on a display. The system and method can sense an environment using an enhanced vision sensor or other sensor and provide an enhanced vision image or other image in response to data from the enhanced vision sensor or other sensor. The vision system adjusts the sensing operation when an aircraft light is on to reduce back scatter effects.

Another embodiment relates to a method of providing an image on a display. The method includes sensing an environment using a vision sensor and providing the image in response to data from the vision sensor. The vision sensor is synchronized with a vehicle light. Back scatter effects can be advantageously reduced in one embodiment.

Another exemplary embodiment relates to an apparatus for providing image data. The image data is for a vehicle. The vehicle has a light which has an on time and an off time. The apparatus includes a sensor array configured to provide the image data, and a processor configured to control the sensor array. The sensor array is in a sense mode during the off time.

Another exemplary embodiment relates to a display. The display includes a processor configured to provide an enhanced vision image on a display element. The enhanced vision image is provided such that the enhanced vision image does not include sensed data associated with a time when an aircraft light is on.

BRIEF DESCRIPTION OF THE DRAWINGS

Exemplary embodiments are hereafter described, wherein like reference numerals denote like elements, and.

DETAILED DESCRIPTION OF THE PREFERRED EMBODIMENTS

Figure 1:
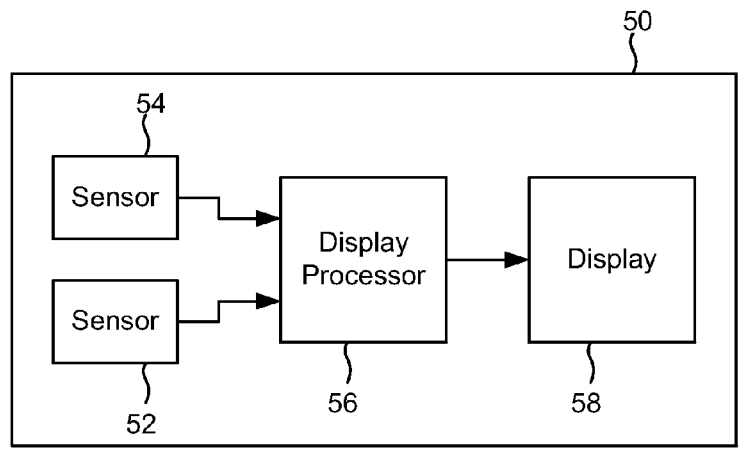
FIG. 1 is a general block diagram of a display system, according to an exemplary embodiment.

Before describing in detail the particular improved system and method, it should be observed that the invention includes, but is not limited to a novel structural combination of conventional video/data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, a display system 50 can be implemented in a wide variety of applications. Display system 50 can be an enhanced vision system (EVS), a remote vision system (RVS) or other imaging system. For example, system 50 may be implemented in systems including but not limited to military targeting systems, medical imaging display systems, security systems, navigation systems, remote control systems, land based vehicle HUD, HMD, or head down display systems, naval based vehicle HUD, HMD, or head down display systems or aircraft HUD, HMD or head down display systems. Display system 50 is not limited to use in aircraft environments.

In one environment, display system 50 includes a sensor 54, a display processor 56 and a display 58. Additional sensors such as sensor 52 can also be provided. Display processor 56 can be an electronic device, such as hardware, software, or combination thereof suitable for processing sensed images, such as, EVS images or RVS images in one embodiment. Display processor 56 is preferably coupled to display 58 and provides a display signal or data, such as a video signal, which causes display 58 to show information or content. The information or content includes the sensed image in one embodiment. The sensed image can be fused with other images and with computer generated text, images and symbology.

Display processor 56 is coupled to sensor 54 in one exemplary embodiment. Sensor 54 is an EV sensor, such as, a visible or non-visible light camera in one embodiment. Sensor 54 can include a sensor array for sensing light in the environment. Processor 56 can be integrated with or separate from sensor 54 and/or display 58.

Display 58 can be any type of display including light emitting diode (LED) based displays, liquid crystal displays (LCDs), cathode ray tubes (CRTs), etc. Display 58 can be part of other systems and can be a primary flight display, HMD or HUD. The sensed image is provided to the operator/viewer of system 50 in a preferred embodiment.

In one embodiment, sensor 54 can be configured to avoid sensing operations when lights that cause back scatter are on or illuminated. Processor 56 or a processor integrated within sensor 54 can prevent sensing or remove sensed data that occurs when such lights are on.

In one embodiment, processor 56 can synchronize the sensing operation with off periods of lights. In one embodiment, processor 56 can synchronize non-sensing operations (e.g., reading out, accumulation, transmitting, etc.) of sensors 52 and 54 with on periods of lights.

It should be noted that, although processor 56 is depicted in FIG. 1 as a single unit, a composition of two or more separate processing units can perform the processing functions of processor 56, either in whole or in part. According to one embodiment, display system 50 can be provided as part of or integrated with other systems associated with the application for system 50. Various processors and devices can be used to control the sensing operation.

Sensor 54 may have certain acquisition parameters in one embodiment. The parameters may include acquisition frequency, processing time, etc. The data acquisition frequency of a sensor device may be described in terms of an acquisition time interval, as frequency is an inverse of time. For example, an acquisition frequency of 0.5 Hz is equivalent to sampling (or detecting) every 2 seconds. The (data) acquisition time interval of sensors 52 and 54 described herein is not limited to any particular value and may be any value depending on the sensor device employed. The time interval may range from nanoseconds to microseconds to seconds, or even longer. The acquisition time interval of sensors 52 and 54 may be longer or shorter than a pulsing time of the pulsing signal, depending on the application.

In one embodiment, the sensor device may have an acquisition time interval of between about 2 ms and about 100 ms—e.g., between about 3 ms and about 80 ms, between about 4 ms and about 60 ms, between about 5 ms and about 40, between about 6 ms and about 30 ms, between about 7 ms and about 20 ms, between about 8 ms and about 15 ms, between about 9 ms and about 12 ms. A different value or range may also be suitable, depending on the application. In one embodiment, the sensor device may have an acquisition time interval of about 5, 6, 7, 8, 9, 10, 11, 12, 13, 14, 15, 16, 17, 18, 19, 20 ms, or more. The sensor acquisition time can be advantageously synchronized with the light system in the environment to prevent back scatter from affecting the sensed image in one embodiment.

The acquisition time can include a 10 ms integration or sense period (e.g., 1 ms-100 ms) and a 2 ms (e.g., 0.5 ms-10 ms) readout period in one embodiment. In the 10 ms acquisition period and 2 ms readout period embodiment, the acquisition time is approximately 12 ms. Advantageously, the sense period is synchronized with the periods when lights can cause back scatter in one embodiment. Alternative values for sense and readout periods or times can be utilized.

Figure 2:
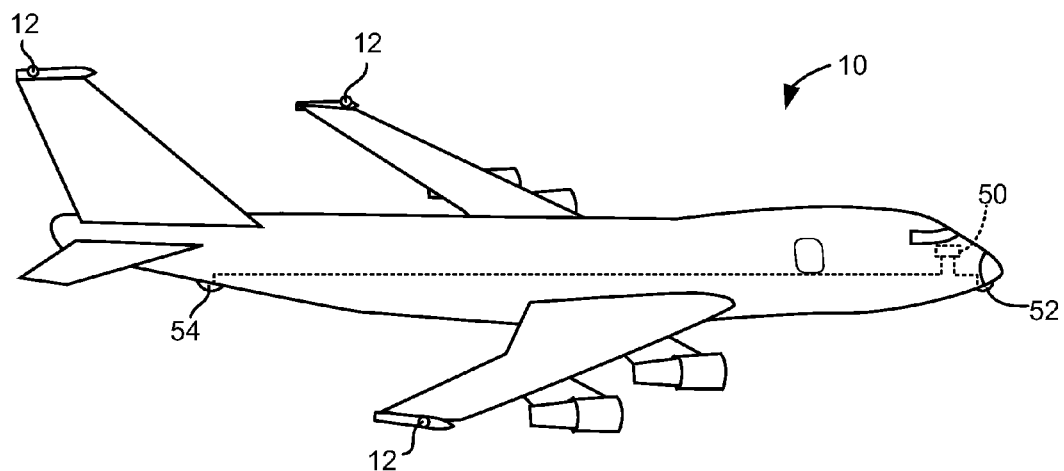
FIG. 2 is a perspective view schematic drawing of an aircraft including on board lights and the display system illustrated in FIG. 1 according to an exemplary embodiment.

With reference to FIG. 2, an aircraft 10 includes display system 50 and lights 12. System 50 can include sensors 52 and 54 disposed at different locations on aircraft 10. Lights 12 can be blinking lights, such as, wing tip anti-collision lights. In one embodiment, lights 12 are on for approximately 1 millisecond and off for the remainder of a one-second period. Alternative on time and off times can be used by lights 12. Aircraft 10 can be any type of vehicle.

Display system 50 is configured to overcome problems associated with back scattered light or other stray light from lights 12. Advantageously, display system 50 operates its sensing operations during the off portion of the duty cycle of lights 12. System 50 can advantageously be configured to sense or detect when lights 12 are off. The data or image can be accumulated and transmitted when lights 12 are on and sensed when lights 12 are off.

Display system 50 can use various techniques for determining when lights 12 are on and off including direct sensing, sensing signals or power provided to lights 12, or determining light on conditions from the image sensed by sensor 52. Accordingly, system 50 can prevent saturated-image artifacts that can cause disorientation of the flight crew, temporary loss of night vision adaptation, and objectionable artifacts.

Figure 3:
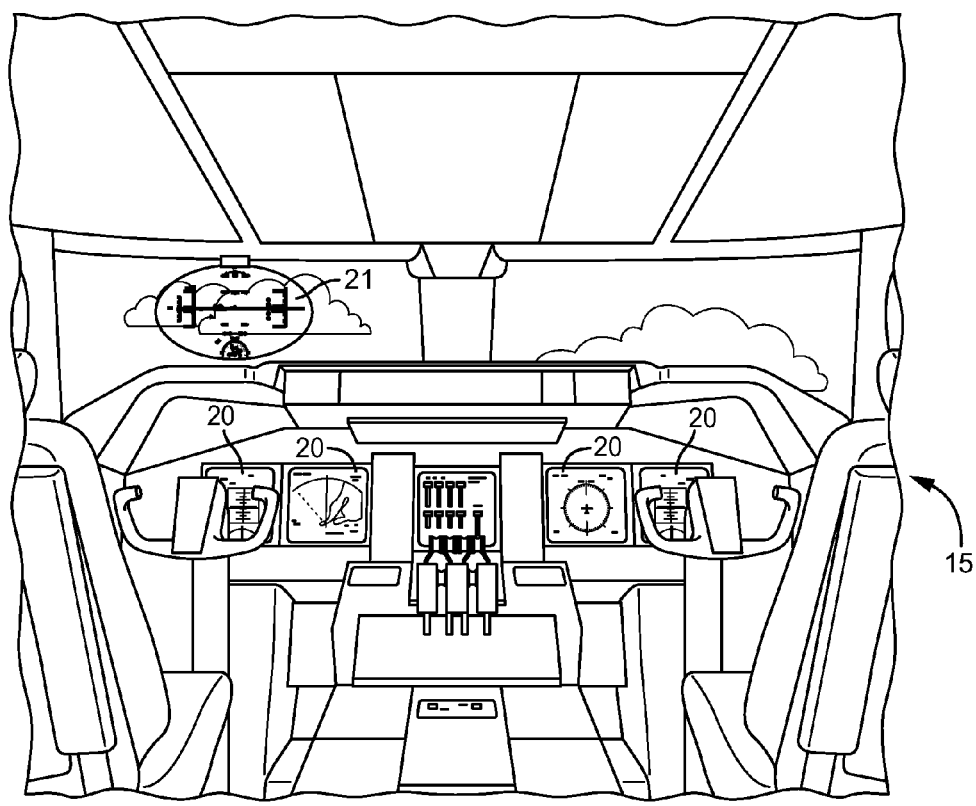
FIG. 3 is a perspective view illustration of a control center or cockpit for the aircraft illustrated in FIG. 2 including the display system illustrated in FIG. 1, according to another exemplary embodiment.

Referring to FIG. 3, an illustration of a control center or cockpit 15 for aircraft 10 is shown, according to one exemplary embodiment. Aircraft control center 15 includes flight displays 20. Flight displays 20 can be used to provide information to the flight crew, thereby increasing visual range and enhancing decision-making abilities. Any of flight displays 20 can be utilized as display 58 for display system 50 (FIG. 1).

In one exemplary embodiment, aircraft control center 15 includes a head up display (HUD) including a combiner 21 or a head worn display (e.g. a helmet mounted display (HMD) with or without a projector.) A display, such as display 58 (FIG. 1), can be configured to provide image content that is projected onto combiner 21. Combiner 21 is a generally transparent medium that the flight crew can see-through. The HUD is generally configured to display at least one of graphical and textual images or indicia and an EV image in one embodiment. Alternatively, the graphical and textual images or indicia and the EV image can be provided to any one or more of displays 20.

Figure 4:
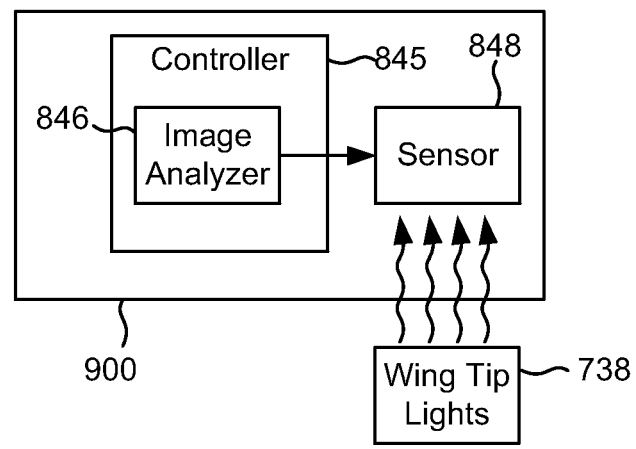
FIG. 4 is a more detailed block diagram of an embodiment of a display system for the control center illustrated in FIG. 3, in accordance with a further exemplary embodiment.

With reference to FIG. 4, a display system 900 is similar to display system 50 discussed above with reference to FIG. 1. Display system 900 includes a sensor 848, a control circuit 845, and a display 852. Control circuit 845 includes an image analyzer 846. Sensor 848 is a camera-type sensor such as an enhanced vision camera. Control circuit 845 controls sensor 848 so that sensor 848 does not receive images when wing tip lights 738 are on in one embodiment. Control circuit 845 can be integrated with sensor 848.

An image analyzer 846 can determine when wing tip lights 830 are on by determining when back scatter occurs using the power levels received by sensor 848. Image analyzer 846 can determine trigger sensing operations in response to the power levels that indicate lights 830 are off.

Circuit 845 can use an algorithm to detect saturated images on sensor 848 and adjust or synchronize the sense period until saturated images are reduced or eliminated in one embodiment. Continual monitoring for saturated images ensures that appropriate synchronization is achieved. The algorithm can be a feedback algorithm that adjusts the sense period until saturated levels are reduced to below a threshold. The feedback algorithm can adjust the trigger signal forward in time for the start of the sense period when the saturated levels are above the threshold and stay the same or are increasing. Once the saturated levels are below the threshold and are no longer decreasing, the trigger period is no longer moved forward in one embodiment. Other feedback algorithms are possible without departing from the scope of the invention.

Figure 5:
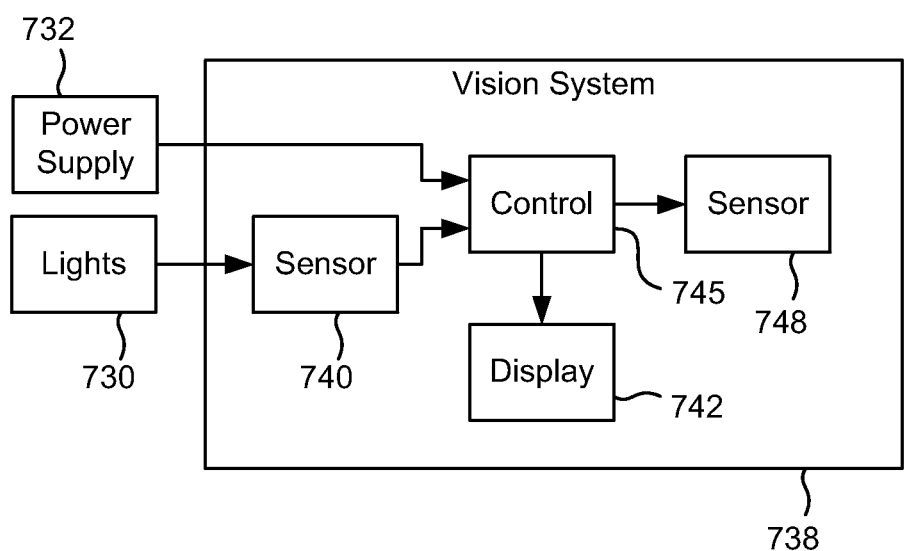
FIG. 5 is a more detailed block diagram of an embodiment of a display system for the control center illustrated in FIG. 3 in accordance with another exemplary embodiment.

With reference to FIG. 5, a display system 738 is similar to display system 50 discussed above with reference to FIG. 1. Display system 738 can include a sensor 740, a control circuit 745, a sensor 748 and a display 742. Aircraft lights 730 such as wing tip lights can provide light that is received by a sensor 740. Sensor 740 detects when lights are on and provides a signal to control 745 which appropriately triggers the sensing operation of sensor 748 when lights 730 are off. Sensor 740 can be an optical sensor or photo detector.

According to another embodiment, control circuit 745 can monitor the power supply 732 associated with lights 730 and determine when lights are turned on based upon control signals used in power supply 732 or changes in power provided by power supply 732 to determine when lights are on. Circuit 745 synchronizes sensor 748 in accordance with such signals in one embodiment.

Figure 6:
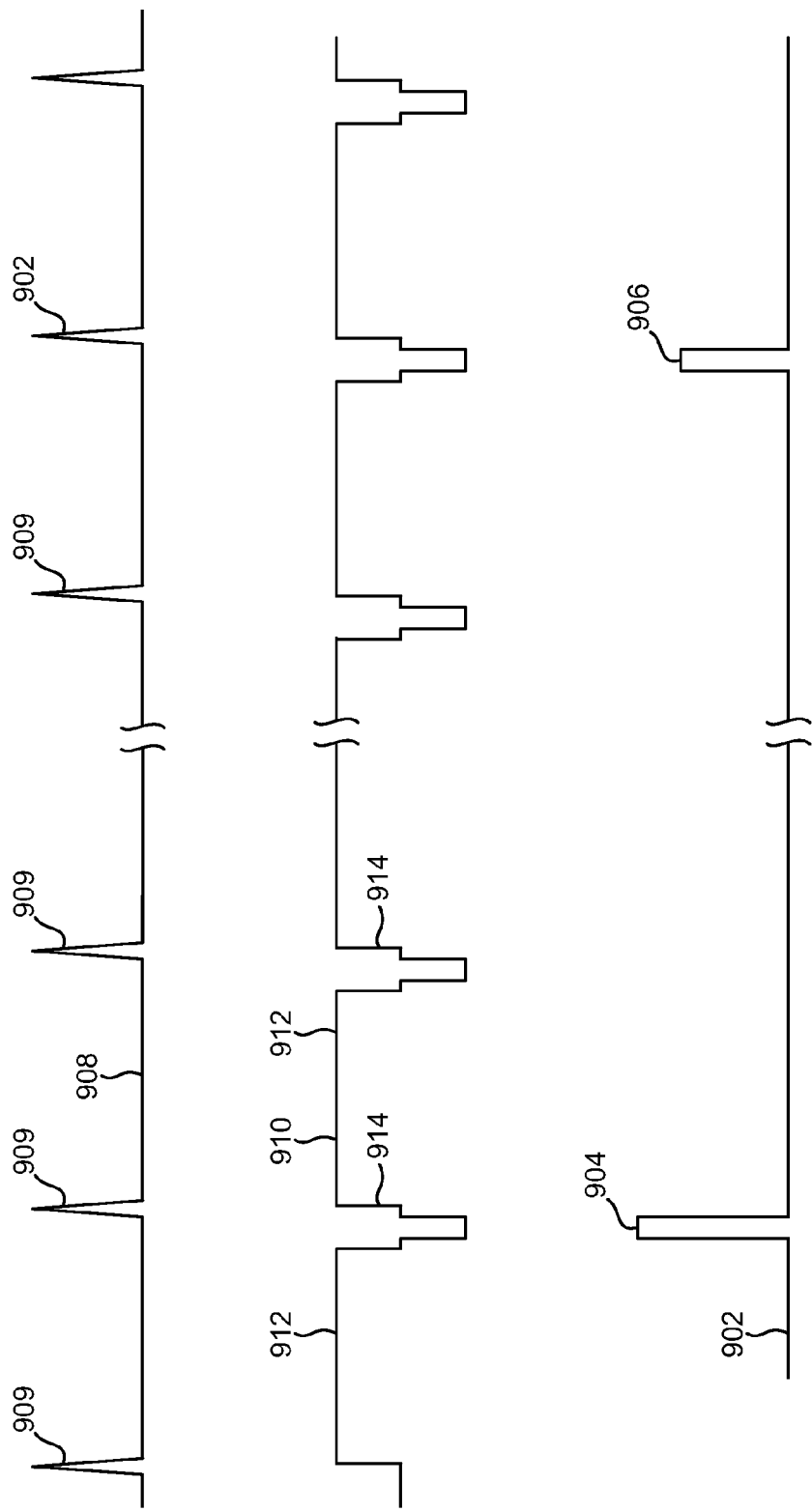
FIG. 6 is a schematic waveform diagram showing operation of the display systems illustrated in FIGS. 4 and 5, in accordance with another exemplary embodiment.

With reference to FIG. 6, a flash from wing tip lights 730 (FIG. 5) is represented by timing diagram 902. Lights 730 flash for a period 904 at a frequency between 40-180 times per minute. A next flash occurs at a period 906.

Image analyzer 845 (FIG. 4) can detect saturated camera images at the times associated with periods 904 and 906 and adjust or synchronize the sensing times associated with sensor 848 according to timing diagram 910. Integration or sensing occurs during a period 912 and readout occurs during a period 914. Trigger signal 909 in timing diagram 908 is timed such that readout occurs during a period associated with flash 904 and flash 906 in one embodiment. Trigger signals 909 can be provided by control circuit 745 or controller 845 to control the sensor array associated with sensors 748 and 848, respectively. The time of the readout (period 914) can be approximately 2 microseconds and the time of the integration period 912 can be 10 microseconds in one embodiment. A number of sense and readout periods may occur between flash times 904 and 906. Readout period 914 is synchronized to be during the flash time in one embodiment.

An algorithm for analyzing detected saturated camera images can be utilized to re-sequence trigger signals 909. The algorithm can continue to adjust trigger signals 909 until saturation levels are brought to being below a minimum threshold. Alternatively, trigger signal 909 can be provided in response to sensing when lights are on or off as explained with reference to FIG. 5.

Figure 7:
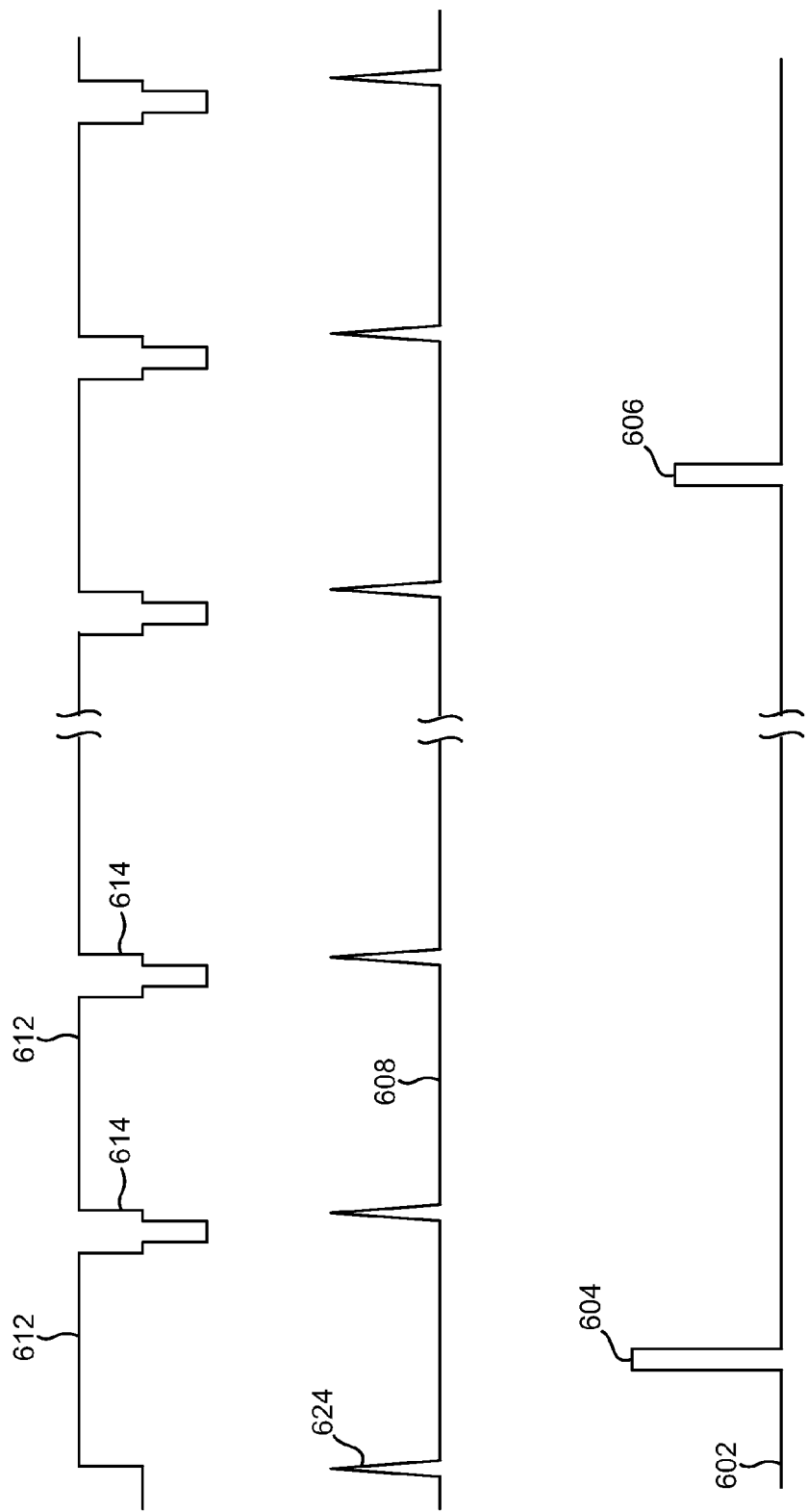
FIG. 7 is a schematic waveform diagram showing operation of a display system without synchronization with aircraft lights.

With reference to FIG. 7, a timing diagram 602 includes a flash period 604 and 606. Trigger signals 624 are not synchronized with flash time 604 and 606. Accordingly, flash period 604 and 606 coincide with a sense time 612, thereby allowing light to affect the sensing operation. Such failure to synchronize allows saturation in sensor 848 which reduces the quality of image provided by vision system 900.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. Although various functions are described as being implemented by circuits, they can be implemented in software or hardware or combinations thereof without departing from the scope of the invention. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of providing an image on a display for an aircraft, the aircraft having a vehicle light, the vehicle light being turned on and off, the method comprising:
   sensing an environment using a vision sensor;
   providing the image on the display in response to data captured by the vision sensor, wherein the vision sensor is synchronized with the vehicle light to sense the data during a sense time period, whereby back scatter effects are reduced;
   processing the data from the vision sensor using an image analyzer to detect a saturation level; and
   adjusting the sense time period according to the saturation level so that the sense time period occurs when the vehicle light is off, wherein the sense time period is adjusted in time when the saturation level is above the threshold until the saturation level is below the threshold.

2. The method of claim 1, wherein the display is in a head up display (HUD) system.

3. The method of claim 1, wherein the vision sensor does not sense the data when the aircraft vehicle light is on, and wherein the non-sensing operations of reading, accumulating, and transmitting are performed by the vision sensor when the vehicle light is on.

4. The method of claim 1, wherein the vision sensor is a visible light camera.

5. The method of claim 4, wherein the vision sensor continually monitors the saturation level and adjusts the sense time period until saturation level is reduced below a threshold and no longer decreasing.

6. The method of claim 5, wherein the vision sensor adjusts the sense time period forward in time when the saturated level is above the threshold until the saturated level is below the threshold and is no longer decreasing.

7. The method of claim 1, wherein an integration time for the vision sensor is during a time when the aircraft vehicle light is on.

8. The method of claim 1, wherein the saturation level is compared to a threshold to determine if the vehicle light is on.

9. The method of claim 8, wherein the vision sensor is a camera.

10. The method of claim 9, wherein the vision sensor is a remote vision sensor.

11. The method of claim 1, wherein the vision sensor is a visible light camera.

12. An apparatus for providing image data, the image data being for a vehicle, the vehicle having a light, the light having an on time and an off time, the apparatus comprising:
   a sensor array configured to provide the image data;
   a processor configured to control the sensor array, wherein the sensor array is in a sense mode during the off time, wherein the processor is configured to detect the on time by detecting a saturation level on the sensor array and comparing the saturation level to a threshold, wherein a sense time period for the sense mode is adjusted in time when the saturation level is above the threshold until the saturation level is below the threshold.

13. The apparatus of claim 11, wherein the sensor array is off during the on time.

14. The apparatus of claim 11, wherein the processor uses a feedback algorithm to control the sensor array.

15. The apparatus of claim 13, wherein the processor and the sensor array are a part of a camera.

16. The apparatus of claim 12, wherein the sensor array is an enhanced vision array.

17. A display system comprising:
   a sensor array configured to provide sensed data for an image; and
   a processor configured to provide the image on a display screen, the image being provided such that the image does not include sensed data associated with a time when an aircraft light is on, wherein the sensed data is detected during a sense time period associated with the aircraft light being off, wherein the sense time period is adjusted in time when a saturated level associated with the sensed data is above a threshold until the saturated level is below the threshold.

18. The display system of claim 17, wherein the image is displayed as an enhanced image.

19. The display system of claim 17, wherein the sensed data is integrated when the aircraft light is off.

20. The display system of claim 18, wherein the processor is part of a visible light camera.

* * * * *